(12) United States Patent
Hanna

(10) Patent No.: US 7,996,713 B2
(45) Date of Patent: Aug. 9, 2011

(54) SERVER-TO-SERVER INTEGRITY CHECKING

(75) Inventor: Stephen R. Hanna, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 249 days.

(21) Appl. No.: 12/334,611

(22) Filed: Dec. 15, 2008

(65) Prior Publication Data

US 2010/0153781 A1    Jun. 17, 2010

(51) Int. Cl.
*G06F 11/00* (2006.01)
(52) U.S. Cl. .......................................... 714/10; 709/224
(58) Field of Classification Search ........................ None
See application file for complete search history.

(56) References Cited

U.S. PATENT DOCUMENTS

| | | | |
|---|---|---|---|
| 7,299,276 B1 | 11/2007 | Strawn | |
| 7,805,511 B1 * | 9/2010 | Panicker et al. | 709/224 |
| 2002/0073211 A1 * | 6/2002 | Lin et al. | 709/229 |
| 2006/0048017 A1 * | 3/2006 | Anerousis et al. | 714/47 |
| 2007/0214388 A1 * | 9/2007 | Auvenshine et al. | 714/27 |
| 2007/0220141 A1 * | 9/2007 | Primm et al. | 709/224 |
| 2007/0294369 A1 * | 12/2007 | Ginter et al. | 709/217 |
| 2007/0294399 A1 * | 12/2007 | Grossner et al. | 709/224 |
| 2008/0040174 A1 * | 2/2008 | Murthy et al. | 705/7 |
| 2008/0215918 A1 * | 9/2008 | Srivastava et al. | 714/24 |
| 2008/0240086 A1 * | 10/2008 | Bouckaert et al. | 370/352 |
| 2008/0247320 A1 * | 10/2008 | Grah et al. | 370/241 |
| 2010/0049795 A1 * | 2/2010 | Tock et al. | 709/203 |
| 2010/0107237 A1 * | 4/2010 | Kitamura et al. | 726/12 |
| 2010/0131638 A1 * | 5/2010 | Kondamuru | 709/224 |
| 2010/0131946 A1 * | 5/2010 | Degaonkar et al. | 718/1 |
| 2010/0161714 A1 * | 6/2010 | Dongre | 709/203 |

FOREIGN PATENT DOCUMENTS

| | | |
|---|---|---|
| EP | 1 533 701 | 5/2005 |
| WO | WO 2006/020823 | 2/2006 |
| WO | WO 2008/034009 | 3/2008 |

OTHER PUBLICATIONS

European Search Report corresponding to EP 09 17 9054, mailed Sep. 17, 2010, 8 pages.

* cited by examiner

*Primary Examiner* — Robert W Beausoliel, Jr.
*Assistant Examiner* — Neil Miles
(74) *Attorney, Agent, or Firm* — Harrity & Harrity, LLP

(57) ABSTRACT

A method performed by a primary server includes receiving integrity criteria and sending a health check request to a secondary server based on the received integrity criteria. The method also includes receiving integrity information from the secondary server and checking the integrity information against the integrity criteria. The method further includes initiating a non-compliance action if the integrity information does not comply with the integrity criteria.

20 Claims, 6 Drawing Sheets

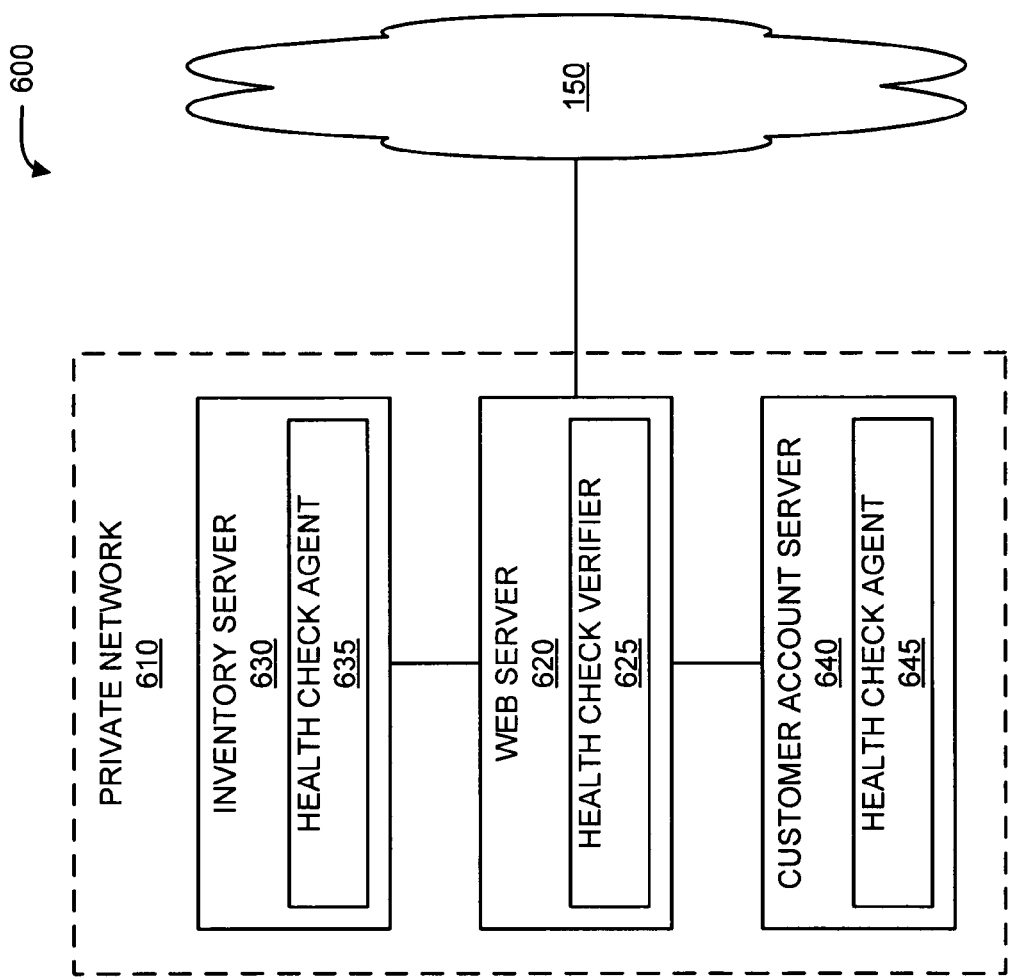

SERVER-TO-SERVER INTEGRITY CHECKING

BACKGROUND

Computer servers can handle confidential data and perform critical operations. The proper behavior of these servers is essential for the proper functioning of our economy and government. "Primary" servers can depend on "secondary" servers (and on networked peripheral devices) in critical ways. The failure or compromise of a secondary server or peripheral device can cause the failure or compromise of the primary server. Therefore, it can be essential to verify the security of the secondary servers and peripheral devices.

Generally, integrity checks of an endpoint may be applied before access is granted to a network, in addition to traditional user authentication and/or authorization. For example, before granting access, a network may wish to check if an endpoint's virus protection program is up-to-date, if the endpoint has downloaded the correct software patches, if the endpoint has any spyware or viruses present, etc. However, these integrity checks do not pertain to server-to-server and server-to-peripheral health checking.

SUMMARY

In one implementation, a method performed by a primary server may include receiving integrity criteria, sending a health check request to a secondary server based on the received integrity criteria, receiving integrity information from the secondary server, checking the integrity information against the integrity criteria, and initiating a non-compliance action if the integrity information does not comply with the integrity criteria.

In another implementation, a system may include a health check verifier included in a primary device and a health check agent included in a secondary device. The health check verifier may obtain integrity criteria selected for the primary device, send a health check request to a secondary device based on the integrity criteria, receive integrity information from the secondary device in response to sending the health check request to the secondary device, check the integrity information against the integrity criteria, and initiate a non-compliance action if the integrity information does not comply with the integrity criteria. The health check agent may send integrity information to the primary device in response to the health check request.

In a further implementation, a computer-readable memory having computer-executable instructions may include one or more instructions to store integrity criteria; one or more instructions to send a health check request to a secondary device based on the stored integrity criteria, one or more instructions to receive integrity information from the secondary device, one or more instructions to compare the integrity information from the secondary device with the integrity criteria; one or more instructions to initiate a non-compliance action if the integrity information from the secondary device does not comply with the integrity criteria, and one or more instructions to send different integrity information to the secondary device in response to a health check request from the secondary device.

In still another implementation, a device may include means for storing integrity criteria for a primary device, means for sending a health check request from the primary device to a secondary device based on the stored integrity criteria, means for receiving in response to the health check request, integrity information from the secondary device at the primary device, means for comparing the integrity information from the secondary device with the stored integrity criteria, and means for initiating a non-compliance action if the integrity information does not comply with the integrity criteria.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6 is a diagram of another exemplary network in which concepts described herein may be implemented.

DETAILED DESCRIPTION

The following detailed description refers to the accompanying drawings. The same reference numbers in different drawings may identify the same or similar elements. Also, the following detailed description does not limit the invention.

Overview

Systems and/or methods described herein may implement health checking between a primary server and a secondary server and/or between a primary server and a peripheral device. A primary server can check the security and health of secondary servers and peripheral devices by using a network access control (NAC) protocol run over an appropriate transport protocol. Secondary servers and peripheral devices may be collectively referred to herein as "secondary devices." The health check can be mutual (e.g., servers checking each other) or one-sided (e.g., a primary server checking a secondary device). In one implementation, the primary server may use its own criteria for what constitutes acceptable health. For mutual health checks, the secondary devices may also use their own criteria for what constitutes acceptable health.

In another implementation, at the end of the health check process, keys (such as public/private key pairs) or other credentials can be exchanged so that the health check can be securely tied to other communications between the parties to the health check, even if those other communications take place over another protocol. The health check process can be ongoing with periodic rechecks or rechecks triggered by changes in policy or changes in system status.

A "health check," as the term is used herein, may be broadly interpreted to include any functionality that collects server and/or peripheral device integrity data, verifies the integrity data, and/or provides other functions with respect to authenticating and verifying the security of the server and/or peripheral device.

"Integrity criteria," as the term is used herein, may be broadly interpreted to include any information to characterize a health check within a network device (e.g., a server or a peripheral device). For example, integrity criteria may include information concerning system requirements, such as whether a virus protection program is up-to-date and/or running with current signatures, whether the network device has downloaded the correct software patches, whether the network device is in compliance with respect to operating system versions and/or any other programs that may be required or forbidden, whether the network device has any spyware or viruses present, etc.

Exemplary Network

Figure 1:
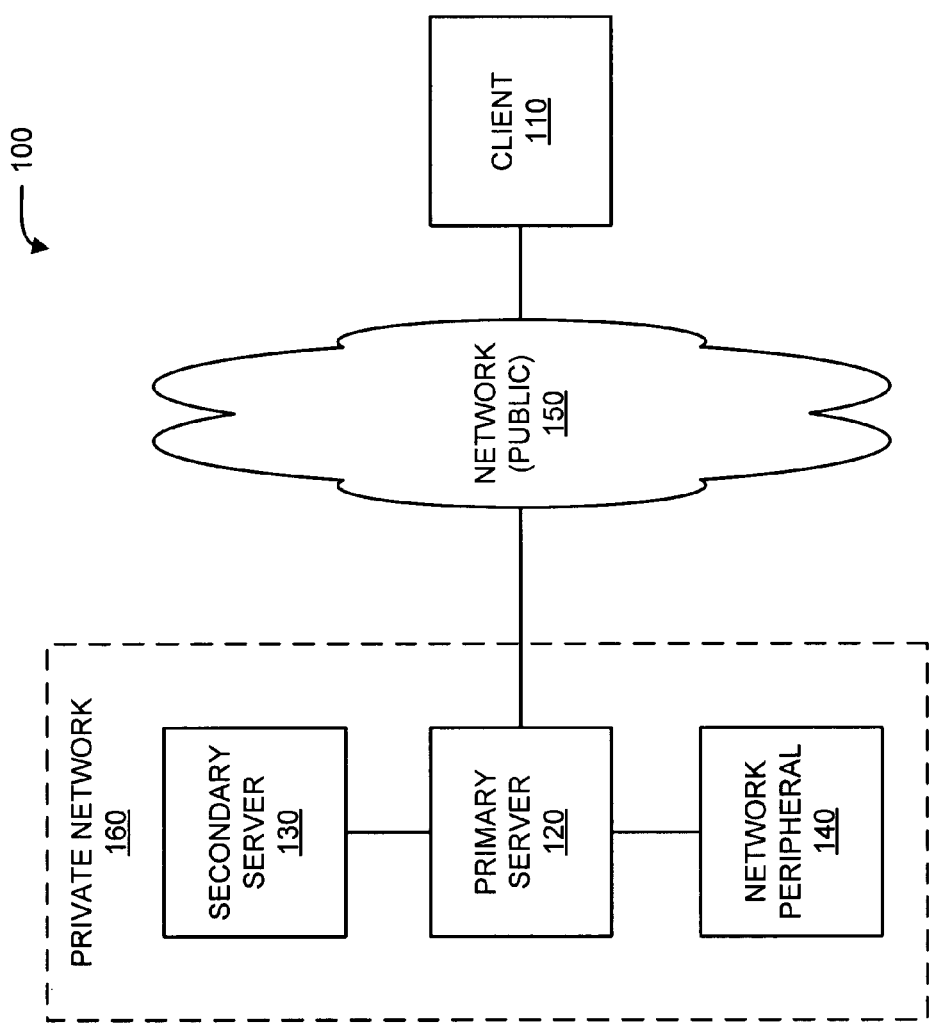
FIG. 1 is a diagram of an exemplary network in which concepts described herein may be implemented.

FIG. 1 is an exemplary diagram of a network 100 in which systems and methods described herein may be implemented. Network 100 may include a client 110, a primary server 120, a secondary server 130, a network peripheral 140, and a public network 150. A single client 110, primary server 120, secondary server 130, and network peripheral 140 have been illustrated in FIG. 1 for simplicity. In practice, there may be more clients 110, primary servers 120, secondary servers 130, and/or network peripherals 140. Also, in some instances, one of primary server 120, secondary server 130, or network peripheral 140 may perform a function of another one of primary server 120, secondary server 130, or network peripheral 140.

As shown in FIG. 1, client 110 may connect to a private network 160, which may contain primary server 120, secondary server 130, and network peripheral 140, via public network 150. Private network 160 may include a local area network (LAN), a private network (e.g. a company intranet), or another type of network. Private network 160 may also include organizational components, devices, servers, etc. (not shown in FIG. 1). Public network 150 may include a local area network (LAN), a wide area network (WAN), a metropolitan area network (MAN), a telephone network, such as the Public Switched Telephone Network (PSTN), the Internet, an intranet, other networks, or a combination of networks.

Client 110 may include a device, such as a personal computer, a wireless telephone, a personal digital assistant (PDA), a laptop, or another type of computation or communication device, a thread or process running on one of these devices, and/or an object executable by one of these devices. Client 110 may initiate a request, to a component, such as primary server 120, to access resources within private network 160.

Primary server 120 may include a server device, or a set of server devices, that contain information, e.g., network content. In one implementation, primary server 120 may take the form of a provider of network content, such as a file, a web page, an e-mail, an instant message, a document, etc. In one implementation, primary server 120 may retrieve information from and/or provide information to another component within private network 160 to facilitate a request from client 110. For example, in some implementations, primary server 120 may be a web server, an e-mail server, or a voice-over-Internet-protocol (VoIP) server.

Secondary server 130 may include a server device, or a set of server devices, that contain information (e.g., network content), to supplement or assist primary server 120. For example, in one implementation, secondary server 130 may include a file server or a database server that provides content to and/or receives information from a web server. In other implementations, secondary server 120 may include an e-mail server in communication with another e-mail server or a VoIP server in communication with another VoIP server.

Network peripheral 140 may include one or more peripheral devices that have a memory and a central processing unit (CPU) and that may communicate with primary server 120. For example, in some implementations, network peripheral 140 may be a disk array, a hard drive, a printer, a keyboard, a tape drive, a communications device and/or another peripheral that could potentially be compromised by unauthorized network access.

Primary server 120 may perform one or more operations or services in response to, for example, a request provided by client 110. For example, in one implementation, primary server 120 may receive a request from client 110, and may provide authentication of client 110 for access to primary server 120 and/or private network 160. In some implementations, primary server 120 may need to exchange information with secondary server 130 and/or network peripheral 140 to facilitate servicing the request from client 110.

Primary server 120 may conduct a health check of secondary server 130 and/or network peripheral 140 by using a NAC protocol (such as Trusted Network Connect Client-Server (IF-TNCCS)) run over a suitable transport protocol (such as Transport Layer Security (TLS)). Primary server 120 may use its own criteria for what constitutes acceptable health and initiate health checks at pre-established intervals and/or based on particular triggers (e.g., expiration of a timer or change in system status of the primary or secondary server).

In some situations, secondary server 130 and/or network peripheral 140 may also initiate a health check of primary server 120. The health check initiated by secondary server 130 and/or network peripheral 140 may be conducted either simultaneously or sequentially with the health check initiated by primary server 120. Secondary server 130 and/or network peripheral 140 may use its own criteria for what constitutes acceptable health of the primary server 120.

In the event of a failed health check, the requestor (e.g., primary server 120, secondary server 130/network peripheral 140) may perform one or more non-compliance actions to ensure data security is not compromised. Non-compliance actions may include, for example, logging the event, sending a message to a network administrator, aborting the data exchange, allowing a partial data exchange, switching to a back-up device of the non-compliant device, initiating an automated repair of the non-compliant device, and/or notifying client 110 of a transaction error.

Although FIG. 1 shows exemplary components of network 100, in other implementations, network 100 may contain fewer, additional, different, or differently arranged components than depicted in FIG. 1. For example, network 100 may include a data transfer device, such as a gateway, a router, a switch, a firewall, a bridge, a proxy server, or the like. In still other implementations, one or more components of network 100 may perform the tasks performed by one or more other components of network 100.

Exemplary Network Device Architecture

Figure 2:
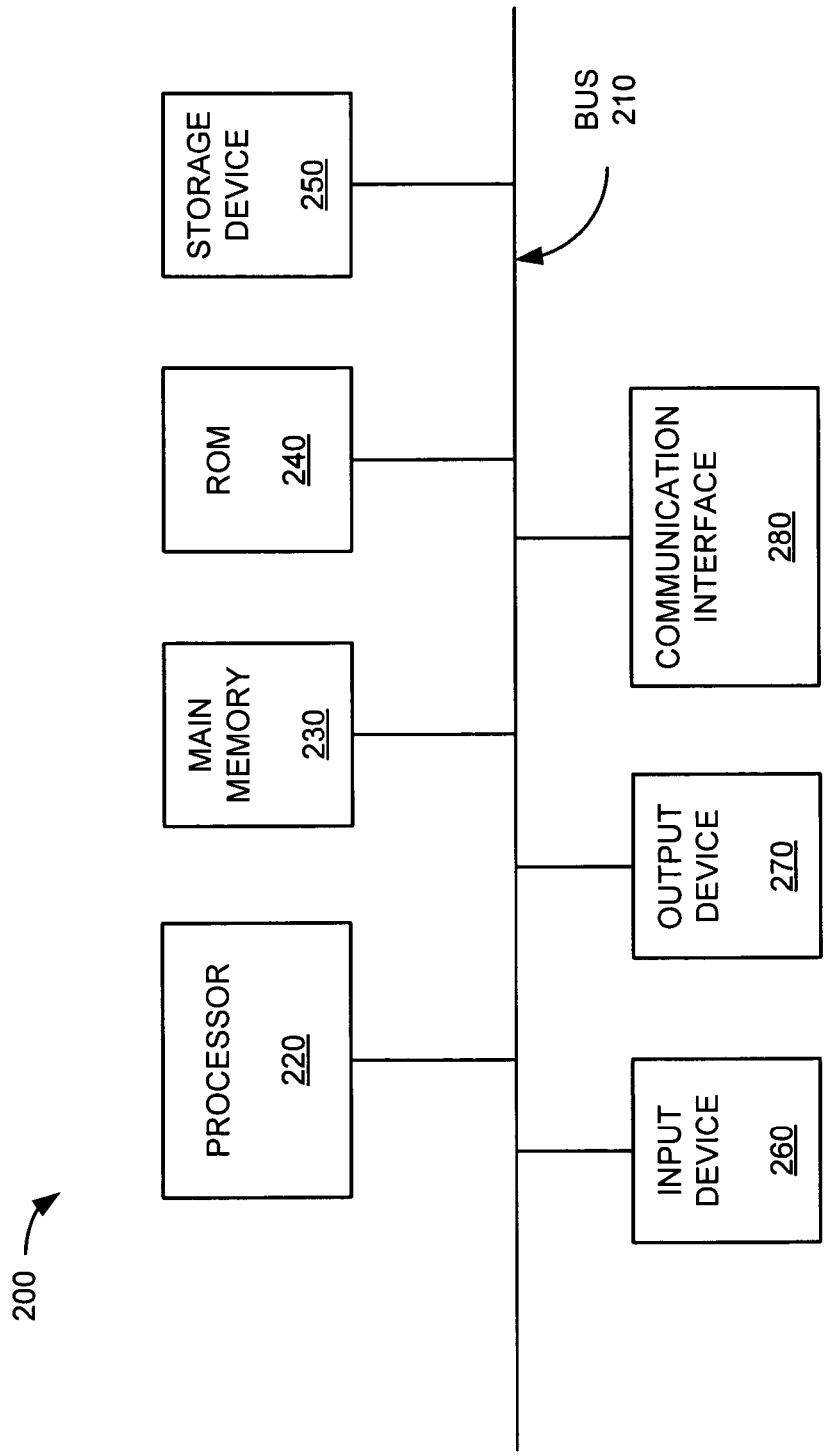
FIG. 2 is a block diagram of an exemplary network device of FIG. 1.

FIG. 2 is a block diagram of an exemplary network device 200, which may correspond to primary server 120, secondary server 130 and/or network peripheral 140. As shown, network device 200 may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

As will be described in detail below, network device 200 may perform certain operations. Network device 200 may perform these operations in response to processor 220 executing software instructions contained in a computer-readable medium, such as main memory 230. A computer-readable medium may be defined as a physical and/or logical memory device.

The software instructions may be read into main memory 230 from another computer-readable medium, such as data storage device 250, or from another device via communication interface 280. The software instructions contained in main memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary elements of network device 200, in other implementations, network device 200 may contain fewer, additional, different, or differently arranged additional elements. In still other implementations, one or more elements of network device 200 may perform the tasks performed by another one or more elements of network device 200.

Figure 3:
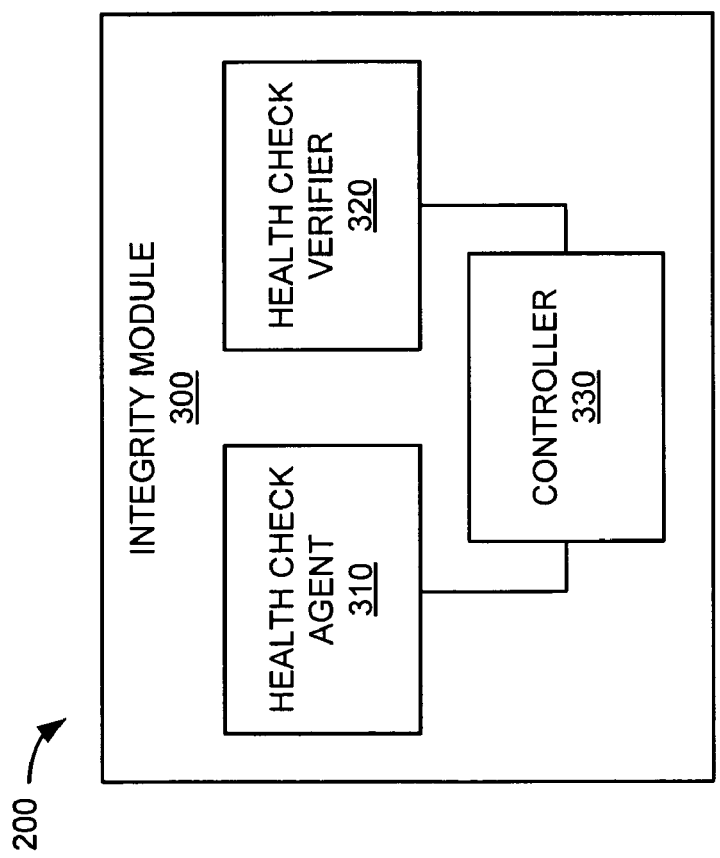
FIG. 3 is a functional block diagram of an exemplary network device of FIG. 1.

FIG. 3 is a functional block diagram of a portion of network device 200. As illustrated, network device 200 may include an integrity module 300, which may include a health check agent 310, a health check verifier 320, and a controller 330. For purposes of explaining FIG. 3, functions of health check agent 310 and health check verifier 320 will be discussed in the exemplary context of a health check being initiated by primary server 120 and the health check being responded to by secondary server 130.

Integrity module 300 may include hardware and/or software associated with network integrity processes. In some implementations, integrity module 300 may include health check agent 310 and/or health check verifier 320 controlled by controller 330. Integrity module 300 may receive and store integrity criteria, provide authentication services (e.g., for a network device 200 and/or a user of client 110), provide integrity checks (e.g., of a network device 200), provide access control (e.g., to a resource protected by integrity module 300) and/or other integrity-related processes. In one implementation, integrity module 300 may receive the integrity criteria and/or updates to the integrity criteria from an operator (e.g., a network administrator via input device 260 or communication interface 280). Integrity module 300 may also receive integrity criteria and/or updates to the integrity criteria from a central management system for multiple servers within, for example, a private network. Integrity module 300 may further receive integrity criteria and/or updates to the integrity criteria from subscriptions to one or more third party providers to provide initial configurations, notifications of changes, updates, software patches, etc. Integrity module 300 may store (e.g., in main memory 230) the integrity criteria and/or updates to the integrity criteria.

Controller 330 may include hardware and/or software to control operations of integrity module 300, health check agent 310, and health check verifier 320. In one implementation, based on the stored integrity criteria, controller 330 of primary server 120 may initiate sending a health check request to health check agent 310 of secondary server 130. For example, the integrity criteria may include timeliness requirements for software updates, required updates to anti-virus data files, or the like. In another implementation, controller 330 of primary server 120 may identify the integrity criteria for analyzing integrity information received from, for example, secondary server 130 and/or network peripheral 140.

The integrity criteria may also include information regarding when health checks may be required (i.e., health check triggers). In one implementation, controller 330 of primary server 120 may initiate a health check of secondary server 130 and/or network peripheral 140 before a certain type of information (e.g., private information) is exchanged. In another implementation, controller 330 of primary server 120 may initiate a health check of secondary server 130 and/or network peripheral 140 at regular time intervals (e.g., every two minutes), at particular request counts (e.g., after every 1,000 requests from primary server 120), or at random time intervals or request counts. In another implementation, controller 330 of primary server 120 may initiate a health check in response to a change in system status (e.g., a change in anti-virus settings) or a change in policy (e.g., an increased level of security for a network).

Health check agent 310 may generally perform procedures to enable network device 200 (e.g., secondary server 130) to respond to a health check request. Health check agent 310 may include hardware and/or software that enable a device to collect and assemble integrity information in accordance with one or more NAC protocols. For example, in one implementation, health check agent 310 may be configured to generally comply with Trusted Network Connect (TNC) architecture promulgated by the Trusted Computing Group (TCG). Health check agent 310 may provide integrity information to a network device 200 (e.g., primary server 120) in response to health check requests.

Health check verifier 320 may generally perform procedures when network device 200 (e.g., primary server 120) initiates a health check request. Health check verifier 320 may include hardware and/or software to receive the results of integrity checks from secondary server 130 and provide an integrity recommendation to integrity module 300. Integrity module 300 may grant, limit, or deny data exchanges with secondary server 130 based on the integrity recommendation from health check verifier 320.

If a device (such as secondary server 130 and/or network peripheral 140) is determined to be out of compliance with the integrity criteria, integrity module 300 may initiate a non-compliance action. Non-compliance actions may include, for example, logging the event, sending a message to a network administrator, aborting an existing data exchange, allowing a partial data exchange, switching to a back-up device for the non-compliant device, initiating an automated repair of the non-compliant server, and/or notifying client 110 of a transaction error. Non-compliance actions are discussed in more detail with respect to FIG. 5.

In one implementation, integrity module 300 may also initiate an exchange of keys (such as public/private key pairs and digital certificates) and/or credentials to initiate subsequent communications (i.e., after the health check) between devices using another protocol. For example, after a successful health check, integrity module 300 of primary server 120 may provide authentication keys to secondary server 130 and/or network peripheral 140 to initiate a transport layer security (TLS) protocol handshake sequence between primary server 120 and secondary server 130 and/or network peripheral 140.

While FIG. 3 shows both health check agent 310 and health check verifier 320 included in integrity module 300, in other implementations, a network device 200 may include just health check agent 310 or health check verifier 320.

Exemplary Process

Figure 4:
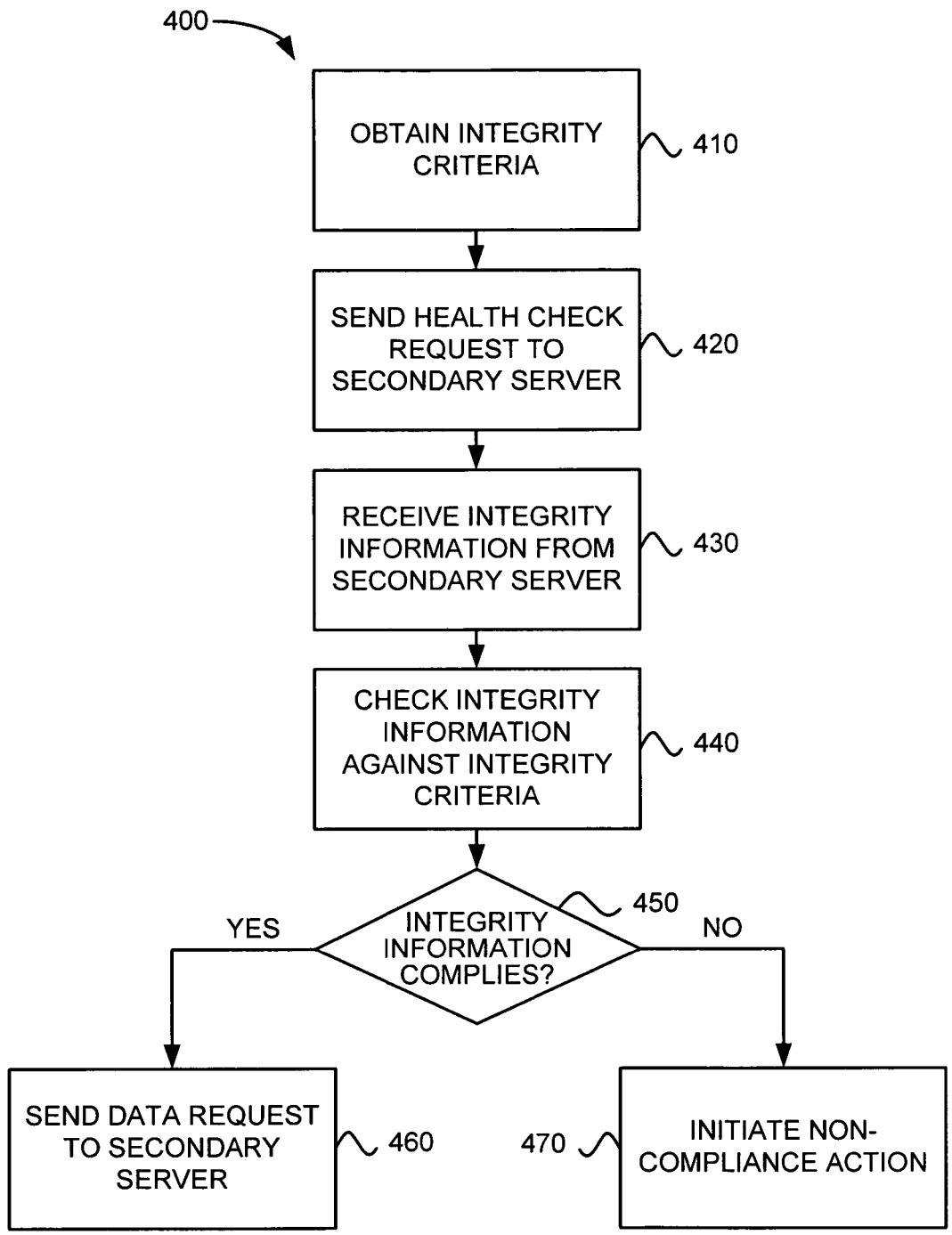
FIG. 4 is a flow diagram illustrating an exemplary process according to implementations described herein.

FIG. 4 is a flow diagram illustrating an exemplary process 400 according to implementations described herein. In one implementation, process 400 may be performed by a network device, such as primary server 120. Process 400 may begin in response to a request from a client (e.g. client 110) for information from primary server 120. The request may require primary server 120 to exchange private information with another network device (e.g., secondary server 130 and/or network peripheral 140) within private network 160. Assume that the request, in this case, requires that primary server 120 gets information from secondary server 130. Before this happens, however, primary server 120 may perform an integrity check on secondary server 130.

Referring to FIG. 4, integrity criteria may be obtained (block 410). For example, integrity module 300 of primary server 120 may receive integrity criteria from an operator (e.g., a network administrator) via input device 260 or from another source as a download from communication interface 280. The integrity criteria may be selected to be particularly suited for a single primary server or for a group of servers within a private network. The integrity criteria may include, for example, timeliness requirements for software updates, updated versions of antivirus data files, and the like. The integrity criteria may also include information regarding when health checks may be required (e.g., health check triggers).

A health check request may be sent to a secondary server (block 420). For example, primary server 120 may send a health check request to secondary server 130. The health check request may be based on the integrity criteria that are specific to primary server 120. For example, if the integrity criteria for primary server require that a virus protection program is up-to-date and/or running with current signatures, the health check request can be configured to include a request for only that information from secondary server 130. The health check request may be provided using a NAC protocol, such as IF-TNCCS, run over a suitable transport protocol, such as TLS.

Integrity information may be received from the secondary server (block 430). For example, health check agent 310 of secondary server 130 may conduct a health check of secondary server 130 in accordance with the health check request from primary server 120. Secondary server 130 may compile integrity information in response to the health check request and send the integrity information to primary server 120 using protocols consistent with the health check request. For example, secondary server 130 may gather current software versions, verify that antivirus/spyware software is up-to-date and/or has been run within a certain amount of time (e.g., within the last 12 hours), etc. Primary server 120 may receive the integrity information from secondary server 130.

The integrity information may be checked against the integrity criteria (block 440). For example, health check verifier 320 of primary server 120 may compare the integrity information from secondary server 130 with the integrity criteria stored by the primary server 120. Based on the check, it may be determined if the integrity information complies with the integrity criteria (block 450).

If the integrity information complies with the integrity criteria, a data request may be sent to the secondary server (block 460). For example, primary server 120 may send a request to secondary server 130 consistent with the client's original request to primary server 120. The request to the secondary server may be sent via the same or a different protocol than was used for the health check request.

In another implementation, as part of the data request, primary server 120 may initiate an exchange of keys (such as public/private key pairs and digital certificates) or other credentials so that the health check can be securely tied to other communications between primary server 120 and secondary server 130, even if those other communications take place over another protocol. For example, along with the data request, primary server 120 may provision authentication keys to secondary server 130 to initiate a transport layer security (TLS) protocol handshake sequence between primary server 120 and secondary server 130. Thus, the authentication keys (such as a public/private key pair and digital certificate) may be used to both verify integrity (i.e., successful completion of the health check process) and identity (i.e., to initiate subsequent secure communications between primary server 120 and secondary server 130 over another protocol).

If the integrity information does not comply with the integrity criteria, a non-compliance action may be initiated (block 470). For example, the integrity module (e.g., integrity module 300) of primary server 120 may initiate one or more non-compliance actions, such as those discussed with respect to FIG. 5 below.

Figure 5:
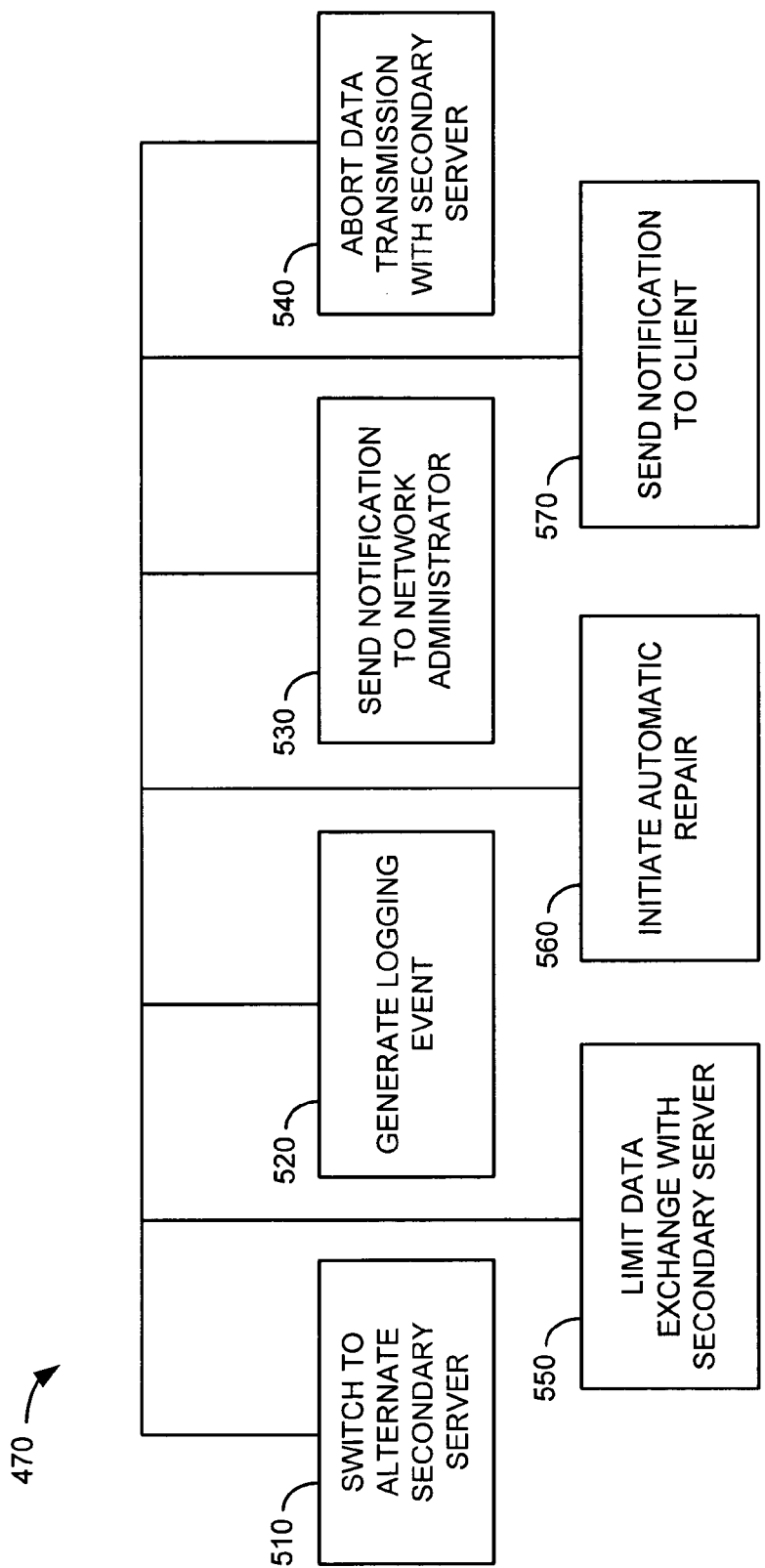
FIG. 5 is a block diagram illustrating exemplary non-compliance actions of FIG. 4.

FIG. 5 is a block diagram illustrating exemplary non-compliance actions of block 470. Exemplary non-compliance actions conducted by the primary server may include switching to an alternative secondary server 510, generating a logging event 520, sending notification to a network administrator 530, aborting an attempted data transmission with the secondary sever 540, limiting the data exchange with the secondary server 550, initiating an automated repair 560, and/or sending a notification to the client 570. The forgoing list of non-compliance actions is not limiting, and other actions may be performed by either the primary server or the secondary server in response to a failed health check. The primary server (i.e., the server that determines the integrity information of another server does not comply with the integrity criteria) may initiate one or more of the following actions simultaneously or in a sequence.

Switching to an alternative secondary server 510 may include the primary server (e.g., primary server 120) terminating communications with the secondary server (e.g., secondary server 130) and using an alternative secondary server to accomplish the desired data exchange, assuming an alternative secondary server is available. Communications with the alternative secondary server may begin by primary server 120 initiating a new health check with the alternative secondary server using, for example, process 400 of FIG. 4.

Generating a logging event 520 may include the primary server recording the information of the non-compliance. The primary server may record, for example, a server identification, time, and nature of the failed integrity check. The information may be compiled with other non-compliance events and may be stored, for example, in memory 230 and/or storage device 250. Information from non-compliance events may be retrieved by a network administrator and/or sent to another computing device at, for example, regular (or non-regular) intervals.

Sending notification to a network administrator 530 may include the primary server providing a message of a non-compliance event to a designated address or individual. The message may be provided in one or more of a variety of formats such as an email, a short message service (SMS) message, an instant message (IM), etc. In one implementation, the notification message may include information from a logging event. In another implementation, the notification message may provide an indication that information of a non-compliance event has been stored on the primary server.

Aborting the data transmission with the secondary server 540 may include the primary server not performing the proposed data exchange that initiated the health check. For example, if the proposed data transmission involved exchanging data for an on-line purchase by a customer, the primary server would not conduct the transaction. Limiting the data transmission with the secondary server 550 may include the primary server performing a partial data exchange with the secondary server. For example, if the proposed data transmission involved exchanging data for an on-line purchase by a customer, the primary server would allow an exchange of some data (e.g., product pricing, shipping calculations, etc.), but may not permit the exchange of private customer information (e.g., credit card information, billing address, etc.).

Initiating an automated repair 560 may include the primary server sending information to the secondary server to initiate a correction to the integrity of the secondary server. The automated repair may be conducted in accordance with protocols capable of automatically recovering from server integrity compromises. For example, the primary server may indicate files (e.g., antivirus files) that are out-dated. As another example, the primary server may initiate repairs by sending a signal to a repair agent that may reside in an isolated area (e.g., a virtual machine) on the secondary server. The repair agent may roll back any undesirable changes, perform any additional changes, determine the point of entry, and/or prevent further compromise.

Sending a notification to the client 570 may include the primary server providing a message to a client (e.g., client 110) that a requested action could not be performed or that the request from the client cannot be processed. The notification may include an explanation of the error, recommendations of alternative connections and/or a statement to try the request at a later time.

EXAMPLE

FIG. 6 provides an exemplary network 600 to illustrate an implementation of the systems and methods described herein. Exemplary network 600 may include a private network 610 for an online bookstore. Private network 610 may include a web server 620 to provide an interface for online customers. Private network 610 may also include an inventory server 630 to track the bookstore inventory and a customer account server 640 to store customers' personal information, such as addresses and payment information. A customer may access web server 620 in this example via public network 150 to search the bookstore inventory and eventually purchase a book. To facilitate the customer's search for a book, web server 620 may need to solicit information from inventory server 630. To facilitate the customer's eventual purchase, web server 620 may need to obtain information from customer account server 640. However, before web server 620 receives information from either inventory server 630 or customer account server 640, it would be beneficial to ensure the integrity of inventory server 630 and customer account server 640 so that private data will not be compromised (e.g., so that data will not be sent to or received from a server that has been compromised by an unauthorized user).

To minimize delays and optimize the customer interface, web server 620 may request a health check of inventory server 630 at certain intervals. Assume, for example, that the integrity criteria (e.g., provided by a network administrator) for web server 620 may require a health check of inventory server 630 every three minutes. Thus, at three minute intervals, web server 620 may send a health check request to inventory server 630 based on the network administrator's criteria. Health check agent 635 residing on inventory server 630 may conduct a health check in accordance with each health check request and send a reply to web server 620. Web server 620 may analyze the integrity information in the reply from inventory server 630. As long as the integrity information is acceptable (e.g., within the criteria set by the network administrator), web server 620 may continue to request and receive inventory information from inventory server 630. If the integrity information from a health check is not acceptable, web server 620 may perform a non-compliance action, such as logging the event, sending a message to a network administrator, and/or aborting the inventory request to inventory server 630.

To ensure every transfer of customer personal information is secure, web server 620 may request a health check of customer account server 640 prior to every transmission of personal information. Particularly, the integrity criteria (e.g., provided by a network administrator) for web server 620 may require a health check of customer account server 640 before each customer purchase or before each change to customer account data. Thus, web server 620 may send a health check request to customer account server 640 based on the network administrator's criteria. Health check agent 645 residing on customer account server 640 may conduct a health check in accordance with each health check request and send a reply to web server 620. Web server 620 may analyze the integrity information in the reply from customer account server 640. If the integrity information is acceptable (e.g., within the criteria set by the network administrator), web server 620 may continue to exchange data with customer account server 640 to complete the customer's purchase and/or account changes. If the integrity information from the health check is not acceptable, web server 620 may perform a non-compliance action, such as logging the event, sending a message to a network administrator, aborting the customer's transaction, and/or notifying the customer of a transaction error.

To further ensure every transfer of customer personal information is secure, customer account server 640 may also request a health check of web server 620 prior to every transmission of personal information or at particular intervals. Thus, account server 640 may send a health check request to web server 620 before responding to a request from web server 620 to transmit data. The health check process may then proceed in a similar manner to that described above.

CONCLUSION

In the systems and/or methods described herein, a primary server (and a secondary server or peripheral device) may be able to use server-specific criteria to conduct server-to-server and/or server-to-peripheral health checks. Integrity criteria may be defined for both the type of integrity information being transmitted and the frequency of each health check. In contrast with Network Access Control systems and health certificates provided by third party servers, systems and methods described herein permit a primary server to use the primary server's own integrity criteria and control health check intervals (including real-time health checks). Also systems and methods herein eliminate the need for a separate certification authority, which can increase system complexity and decrease trust.

The foregoing description of exemplary implementations provides illustration and description, but is not intended to be exhaustive or to limit the invention to the precise form disclosed. Modifications and variations are possible in light of the above teachings or may be acquired from practice of the invention.

For example, while the systems and/or methods described herein have been described primarily in the context of servers and peripheral devices, other network devices, such as routers or gateways, may be used to implement health checks with device-specific integrity criteria using the concepts described herein.

Also, while series of blocks have been described with respect to FIGS. 4 and 5, the order of the blocks may be varied in other implementations. Moreover, non-dependent blocks may be implemented in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware, such as a processor, microprocessor, an application specific integrated circuit or a field programmable gate array; or a combination of hardware and software.

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by a primary server within a private network, the method comprising:
   receiving integrity criteria for the primary server to conduct a health check of a secondary server within the private network;
   receiving, by the primary server and from a client device, a request for information, where the request for information requires the primary server to exchange private data, associated with the client device, with the secondary server;
   sending, by the primary server, a health check request to the secondary server based on the request for information and the received integrity criteria;
   receiving, by the primary server, integrity information from the secondary server that is responsive to the health check request;
   checking, by the primary server, the received integrity information against the integrity criteria;
   initiating, by the primary server, a non-compliance action if the received integrity information does not comply with the integrity criteria; and
   sending, by the primary server and to the secondary server, integrity information for the primary server in response to another health check request, where the other health check request is received from the secondary server.

2. The method of claim 1, where the integrity criteria is particular to the primary server.

3. The method of claim 1, where the integrity criteria is selected for the secondary server.

4. The method of claim 1, where the integrity criteria is selected for a group of servers in a private network including the primary server.

5. The method of claim 1, where sending the health check request is triggered by a type of the private data to be exchanged between the primary server and the secondary server.

6. The method of claim 1, where sending the health check request is triggered by a particular number of exchanges between the primary server and the secondary server.

7. The method of claim 1, where sending the health check request is triggered by a change in system status of the primary server or the secondary server.

8. The method of claim 1, where the non-compliance action includes switching to an alternative secondary server to accomplish the exchange of private data.

9. The method of claim 1, where the non-compliance action includes:
   generating a logging event,
   sending a notification to the client device, and
   aborting the exchange of private data with the secondary server.

10. The method of claim 1, where the non-compliance action includes one or more of:
    limiting a data transmission with the secondary server, or
    initiating an automatic repair of the secondary server.

11. A system, comprising:
    a health check verifier included in a primary device to:
       obtain integrity criteria particularly selected for the primary device to verify a security of a secondary device before exchanging private data with the secondary device,
       send a health check request to the secondary device based on the integrity criteria and a request for information, where the request for information is received from a client device and requires the health check verifier to verify security of the secondary device before exchanging private data with the secondary device;
       receive integrity information from the secondary device in response to sending the health check request to the secondary device,
       check the integrity information against the integrity criteria, and initiate a non-compliance action if the integrity information does not comply with the integrity criteria; and a health check agent included in the secondary device to send integrity information to the primary device in response to the health check request, where the primary device is to:

receive a health check request from the secondary device, and send, to the secondary device and in response to the received health check request, integrity information for the primary device.

12. The system of claim 11, where the secondary device is a peripheral device or another server located in a same private network as the primary device.

13. The system of claim 11, where the primary device and the secondary device are connected by a private network.

14. The system of claim 11, where the primary device includes a web server.

15. The system of claim 14, where the secondary device includes one of a file server, a database server, an e-mail server, or a voice-over-Internet-protocol (VoIP) server.

16. The system of claim 11, further comprising:

a central management system within a private network to provide the integrity criteria to the primary device.

17. The system of claim 11, further comprising:

an alternative secondary device, where the non-compliance action includes the primary device substituting the alternative secondary device for the secondary device to accomplish a data transmission.

18. A computer-readable memory comprising computer-executable instructions, the computer-readable memory comprising:

one or more instructions to store integrity criteria to verify a security of a secondary device before exchanging private data between a primary device and the secondary device;

one or more instructions to receive, at the primary device and from a client device, a request for information, where the request for information requires the primary device to exchange private data with a secondary server;

one or more instructions to send a health check request to the secondary device based on the request for information and the integrity criteria;

one or more instructions to receive integrity information from the secondary device in response to the health check request;

one or more instructions to compare the integrity information from the secondary device with the integrity criteria;

one or more instructions to initiate a non-compliance action if the integrity information from the secondary device does not comply with the integrity criteria; and one or more instructions to send different integrity information to the secondary device in response to a health check request from the secondary device.

19. The computer-readable memory of claim 18, where the one or more instructions to send a health check request to the secondary device includes one or more instructions to send the health check request based on a type of information sought to be transmitted between the primary server and the secondary server.

20. A primary device, comprising:

a memory to store a plurality of instructions; and a processor to execute the stored instructions to:

store integrity criteria for the primary device, receive, from a client device, a request for information, where the request for information requires the primary device to verify a security of a secondary device before exchanging private data between the primary device and the secondary device, send a health check request from the primary device to the secondary device based on the stored integrity criteria, receive, in response to the health check request, integrity information from the secondary device, compare the integrity information from the secondary device with the stored integrity criteria, initiate a non-compliance action if the integrity information does not comply with the integrity criteria; and send integrity information relating to the primary device to the secondary device in response to another health check request, where the other health check request is received from the secondary device.

* * * * *